United States Patent
Bealkowski et al.

(10) Patent No.: US 8,091,085 B2
(45) Date of Patent: Jan. 3, 2012

(54) INSTALLATION OF UPDATED SOFTWARE FOR SERVER COMPONENTS

(75) Inventors: Richard Bealkowski, Redmond, WA (US); James L. Wooldridge, Fall City, WA (US); Dean V. Dubinsky, Bellevue, WA (US)

(73) Assignee: International Business Machines Corporation, Armonk, NY (US)

( * ) Notice: Subject to any disclaimer, the term of this patent is extended or adjusted under 35 U.S.C. 154(b) by 1089 days.

(21) Appl. No.: 11/927,407

(22) Filed: Oct. 29, 2007

(65) Prior Publication Data

US 2009/0113416 A1    Apr. 30, 2009

(51) Int. Cl.
*G06F 9/44* (2006.01)
(52) U.S. Cl. ....................................................... 717/177
(58) Field of Classification Search .................... 717/177
See application file for complete search history.

(56) References Cited

U.S. PATENT DOCUMENTS

| | | | |
|---|---|---|---|
| 7,080,372 B1 | 7/2006 | Cole | |
| 7,093,246 B2 | 8/2006 | Brown et al. | |
| 7,165,250 B2 | 1/2007 | Lyons | |
| 7,203,723 B2 | 4/2007 | Ogawa | |
| 7,203,745 B2 | 4/2007 | Sheehy et al. | |
| 7,499,988 B2 * | 3/2009 | Keohane et al. | 709/221 |
| 7,506,151 B2 * | 3/2009 | Miyamoto et al. | 713/2 |
| 2004/0040021 A1 | 2/2004 | Bharati et al. | |
| 2004/0044999 A1 | 3/2004 | Gibson | |
| 2004/0103411 A1 | 5/2004 | Thayer | |
| 2004/0181790 A1 * | 9/2004 | Herrick | 717/168 |
| 2004/0236907 A1 * | 11/2004 | Hickman et al. | 711/114 |
| 2006/0031828 A1 | 2/2006 | Won et al. | |
| 2007/0192466 A1 * | 8/2007 | Nahum | 709/223 |

OTHER PUBLICATIONS

W-K Wei et al., "Implementation of Nonstop Software Update for Client-Server Applications," Procs. of 27th Annual Int'l Comp. Software & Apps. Conf. (COMPSAC'03), 2003.

* cited by examiner

*Primary Examiner* — Philip Wang
(74) *Attorney, Agent, or Firm* — Thomas Tyson

(57) ABSTRACT

A target server is queried to build an inventory of components installed within the target server. The target server has a boot process by which it is employed within a production environment. Updated software is received for each component from an update server, based on the inventory built. The boot process is configured so that the target server installs the updated software for each component the next time it boots, instead of being employed within the production environment. The target server is caused to boot such that it installs the updated software for each component. Upon completion of the target server installing the update software for each component, the boot process is reconfigured so that the next time the target server boots it is again employed within the production environment. The target server is again caused to boot such that it is again employed within the production environment.

15 Claims, 7 Drawing Sheets

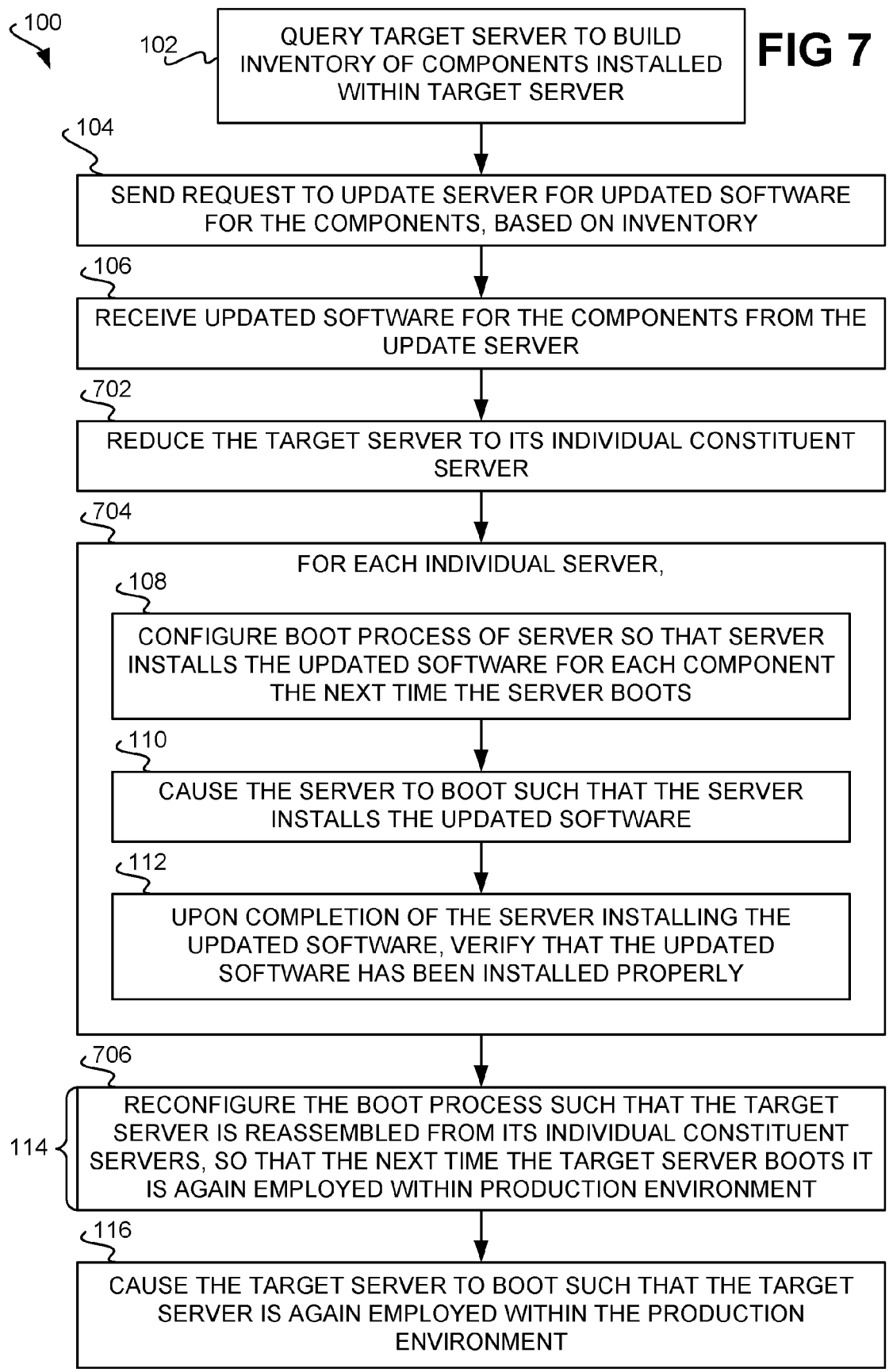

INSTALLATION OF UPDATED SOFTWARE FOR SERVER COMPONENTS

FIELD OF THE INVENTION

The present invention relates generally to a server that has a number of components installed therein, such as hardware and/or software components, and more particularly to installing updated software for these components of the server.

BACKGROUND OF THE INVENTION

The production environment of a group of servers is the environment in which the servers are actively performing functionality for an intended purpose. For example, the servers may have been deployed in the production environment to provide functionality related to databases, web hosting, data storage, and/or other types of intended purposes. The production environment of a server contrasts with a testing or laboratory environment, in which the server is being tested or developed to ensure that it will perform properly when released within the production environment. For example, a server may be intended for deployment in a production environment to perform database-related functionality, but is currently being tested within a laboratory environment to verify that the server will perform properly when so deployed.

However, even once servers have been deployed within a production environment, they may have to be updated. A server may have a number of different hardware and/or software components. Updated software is periodically released for these components so that, to ensure that the server is performing optimally, the server should have the updated software for its components installed. However, for a large production environment in which there can be tens if not hundreds or more of servers, installing updated software for all the potentially different components of all these servers can be laborious, time-consuming, and potentially difficult.

In general, a network administrator or other user has to individually take each server offline, determine the components installed within the server, locate updated software for each such component, manually initiate installation of this updated software, verify that the installation was performed correctly, and then bring the server back online into the production environment. Different update software may have to be installed and configured differently, adding to the difficulty of this process. Because this update process is tedious, time-consuming, and potentially difficult, servers may ultimately not be updated as often as desired or needed. For these and other reasons, therefore, there is a need for the present invention.

SUMMARY OF THE INVENTION

A method of one embodiment of the invention queries a target server to build an inventory of components installed within the target server. The target server has a boot process by which it is employed within a production environment. The method receives updated software for each component from an update server, based on the inventory built. The method configures the boot process so that the target server installs the updated software for each component the next time it boots, instead of being employed within the production environment. Configuration is achieved by: preparing a logical storage volume on one or more storage devices accessible by the target device; populating the logical storage volume with the updated software for each component installed within the target device; and, specifying a logical boot storage volume of the target device as the logical storage volume. The method causes the target server to boot such that it boots from the logical storage volume and installs the updated software for each component. Upon successful completion of the target server installing the update software for each component, the method reconfigures the boot process so that the next time the target server boots it is again employed within the production environment. The method again causes the target server to boot such that it boots from the original storage volume and is again employed within the production environment.

A computer-readable medium of one embodiment of the invention has one or more computer programs stored thereon to perform a method. The computer-readable medium may be a recordable data storage medium, or another type of computer-readable medium. A target server is queried to build an inventory of a number of components installed within the target server. The target server having an original logical storage volume from which the target server is booted to be employed within a production environment. Updated software for each component installed within the target server is received from an update server, based on the inventory built.

A logical storage volume on one or more storage devices accessible by the target server is prepared, and populated with the updated software for each component installed within the target server. A logical boot storage volume of the target server is specified as the logical storage volume. The target server is caused to boot such that the target server boots from the logical storage volume and installs the updated software for each component installed within the target server. Upon successful completion of the target server installing the update software for each component, the logical boot storage volume of the target server is again specified as the original logical storage volume. The target server is then caused to boot such that the target server boots from the original storage volume and is again employed within the production environment.

A computer-readable medium of another embodiment of the invention also has one or more computer programs stored thereon to perform a method. The computer-readable medium may also be a recordable data storage medium, or another type of computer-readable medium. A target server is queried to build an inventory of a number of components installed within the target server. The target server has an original boot configuration via which the target server is booted to be employed within a production environment. Updated software for each component installed within the target server is received from an update server, based on the inventory built.

A network boot program to include the updated software for each component installed within the target server is prepared, and is stored within a logical folder accessible within a preboot execution environment. A boot configuration of the target server is specified as including the preboot execution environment so that the target server executes the network boot program when booting the next time. The target server is caused to boot such that the target server boots via the preboot execution environment and installs the updated software for each component installed within the target server by executing the network boot program. Upon completion of the target server installing the update software for each component, the boot configuration of the target server is again specified as the original boot configuration such that the boot configuration no longer includes the preboot execution environment. The target server is then, upon completion of the target server installing the updated software for each component, and after the boot configuration of the target server has been specified as the original boot configuration, caused to boot such that the target server boots via the original boot configuration and is again employed within the production environment, such that the target server does not execute the network boot program when being booted.

A system of an embodiment of the invention includes one or more networks, and an update server, a target server, and an updated controller communicatively connected to the networks. The update server has updated software for different server components. The target server has a number of components installed therewithin that are to be updated. These components are selected from the different server components. The target server has a boot process by which the target server is employed within a production environment.

The update controller is adapted to perform the following. The controller queries the target server to build an inventory of the components installed within the target server The controller receives the updated software for each component from the update server, based on the inventory built. The controller configures the boot process of the target server so that the target server installs the updated software for each component the next time the target server boots, instead of being employed within the production environment. Configuration is achieved by preparing a network boot program to include the updated software for each component installed within the target server, storing the network boot program within a logical folder accessible within a preboot execution environment, and specifying a boot configuration of the target server as including the preboot execution environment. The controller causes the target server to boot such that the target server installs the updated software for each component. The controller reconfigures the boot process of the target server so that the next time the target server boots the target server is again employed within the production environment, by specifying the boot configuration of the target server as an original boot configuration via which the target server previously booted to be employed within the production environment such that the boot configuration no longer includes the preboot execution environment. The updated controller again causes the target server to boot, upon completion of the target server installing the updated software for each component, and after the boot configuration of the target server has been specified as the original boot configuration, such that the target server is again employed within the production environment, and such that the target server does not execute the network boot program when being booted. The system further includes a storage device having the logical folder, the storage device communicatively connected to the networks.

Embodiments of the invention provide for advantages over the prior art. The target server is updated more quickly, in a less tedious manner, and with less difficulty than in the prior art. In particular, a network administrator is relieved from having to perform much of the work involved in the update process. An update controller queries the target server to build an inventory of the components installed within the target server and retrieves the updated software for these components from an update server. The update controller appropriately configures the boot process of the target server so that the updated software for each component is properly installed within the target server the next time it boots, and then causes the target server to reboot to install this updated software. Once the update process has been completed, the update controller reconfigures the boot process of the target server so that it again can be employed within the production environment the next time it boots, and causes the target server to again reboot so that it is again employed within the production environment.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 7 is a flowchart of a method that is consistent with but more detailed than the method of FIG. 1, according to a scalable server embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview and General Method

Figure 1:
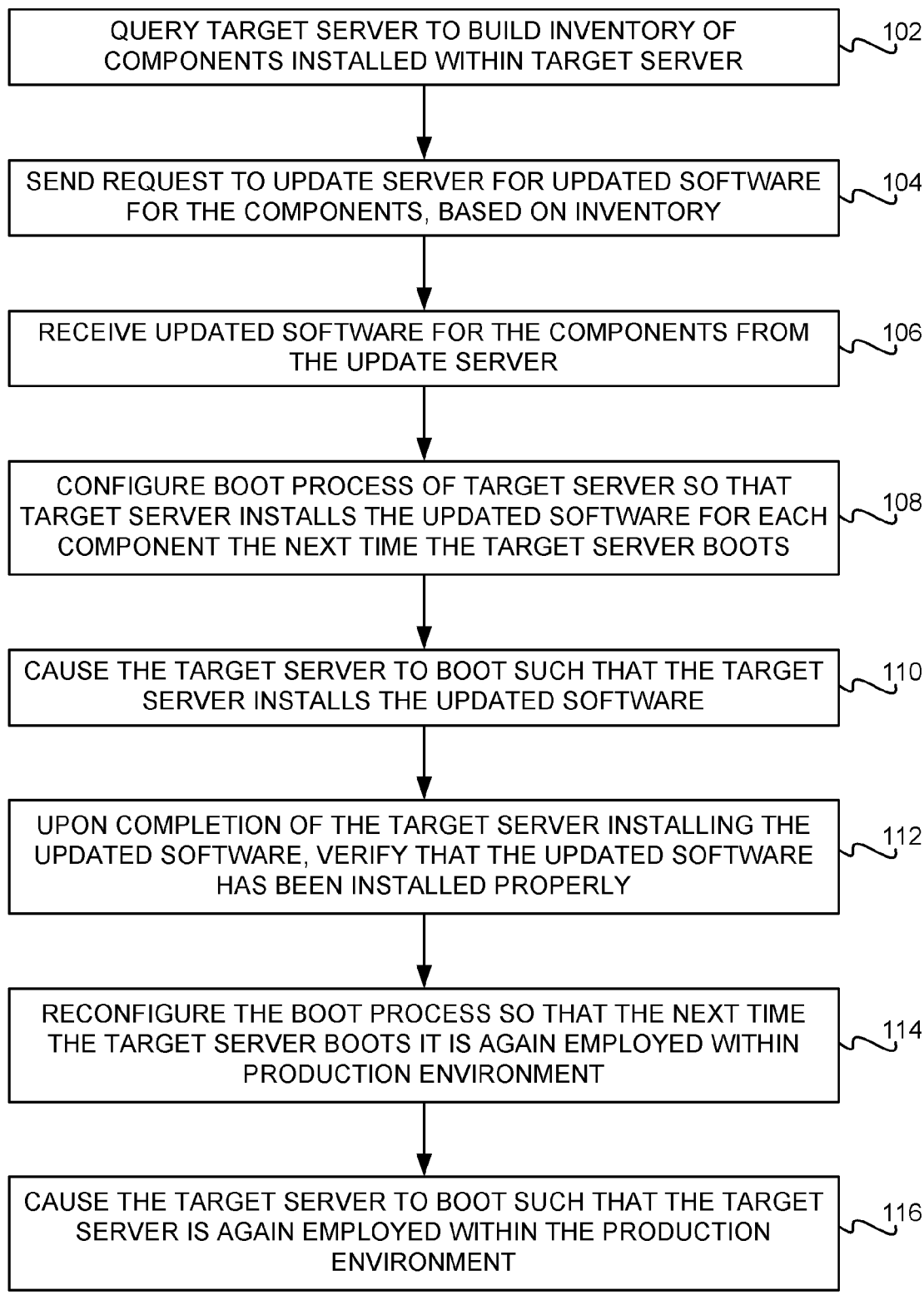
FIG. 1 is a flowchart of a method, according to an embodiment of the invention.

FIG. 1 shows a method 100 for updating a target server, according to an embodiment of the invention. The target server is referred to as a target server solely to distinguish it from other servers that are described in relation to the method 100. The method 100 may be performed by an update controller, as is more specifically described later in the detailed description. The update controller is a separate and different device than the target server in at least some embodiments. The method 100 may be implemented as one or more computer programs stored on a computer-readable medium. It is noted that while this and other embodiments of the invention are described in relation to a server, more generally embodiments may be implemented in relation to any type of device that can be updated by the approach described herein. Such a device is generally referred to as a target device.

The target server has a boot process by which the target server is employed within a production environment that may include other servers as well, where these other servers may also be target servers in relation to which the method 100 can be performed. The boot process is such that when the target server is booted (e.g., rebooted), the target server boots into the production environment where it is employed to perform functionality in furtherance of a desired or an intended purpose. The terminology production environment is used herein consistent with the description provided of this terminology in the background section.

The method 100 queries the target server to build an inventory of the components installed within the target server (102). These components may include hardware and/or software. Such hardware components may be individual hardware components, or hardware subsystems made up of more than one hardware component. Such software components may likewise be individual software components, or software subsystems made up of more than one software component.

Upon having built the inventory of the components installed within the target server, the method 100 sends a request to an update server for updated software for these components, based on the inventory built (104). Thus, the identities of the components may be provided to the update server. The versions of the software for these components as currently installed within the target server may further be provided to the update server so that the update server can determine whether any updated software for these components exists. The update server is a different device than the target server and than the update controller in at least some embodiments.

In response, the method 100 receives the updated software for the components installed within the target server, from the update server (106). Updated software may be received for just those components for which the versions of the software currently installed within the target server are not the latest versions. The software for the components in this respect may be replacement software, patch software, and/or other update software, especially in the case where the components are software components. The software for the components in this respect may be firmware and drivers, as well as replacement software, patch software, and/or other update software, in the case where the components are hardware components.

The method 100 then configures the boot process of the target server so that the next time the target server is (re)booted, the target server installs the updated software for the components identified as having updated software available (108). Two particular embodiments by which the boot process of the target server is configured in this manner are described later in the detailed description. However, in general, the boot process is configured so that the updated software for each component in question is installed within the target software, and is appropriately configured, when the target server is booted again.

The method 100 causes the target server to (re)boot such that the target server thus installs the updated software for the components in question (110). In at least some embodiments, the installation and configuration process of this updated software is performed automatically without any user interaction. The installation and configuration of the updated software for some of the components may require that the target server be rebooted prior to the updated software for other components to be subsequently installed and configured. Such rebooting is considered as part of the updated software installation process, and in at least some embodiments, is also performed automatically without any user interaction.

Upon completion of the target server installing the updated software for the components in question (112), the method 100 verifies that the updated software has been installed properly. Where the updated software has not been installed properly, a network administrator or other user may be notified to manually assess and rectify the situation. It is noted that the method 100 becomes aware that the target server has completed installing the updated software in at least some embodiments by the target server's boot process having been configured in part 108 so that once installation has been completed, the target server notifies the device or component performing the method 100.

The method 100 then reconfigures the boot process so that the next time the target server (re)boots, it is again employed within the production environment (114). For instance, the original boot process by which the target server boots into the production environment may be temporarily saved prior to the boot process being reconfigured in part 108. Therefore, in part 114, the boot process is reset to this saved original boot process so that the target server can again boot into the production environment.

It is noted in this respect that when the target server is caused to boot such that it installs the updated software, the target server is temporarily no longer part of the production environment. Therefore, if the target server was actively performing functionality related to the intended or desired purpose of the production environment prior to booting, it is temporarily relieved of this functionality. For example, if the target server is currently processing any computer programs in this respect, the execution of these computer programs may be migrated to one or more other servers within the production environment so that the target server can install the updated software without affecting the production environment as a whole.

The method 100 concludes by causing the target server to (re)boot again such that the target server is again employed within the production environment (116). As such, the target server is again capable of actively performing functionality in furtherance of the intended or desired purposes of the production environment, but now has updated software installed for its components. If any computer programs were migrated away from the target server prior to its booting in part 110 to install this updated software, or if the target server was otherwise relieved of the functionality it was performing, these computer programs may now be migrated back to the target software, and the target server again made responsible for the functionality it was previously performing.

Logical Boot Storage Volume Embodiments

Figure 2:
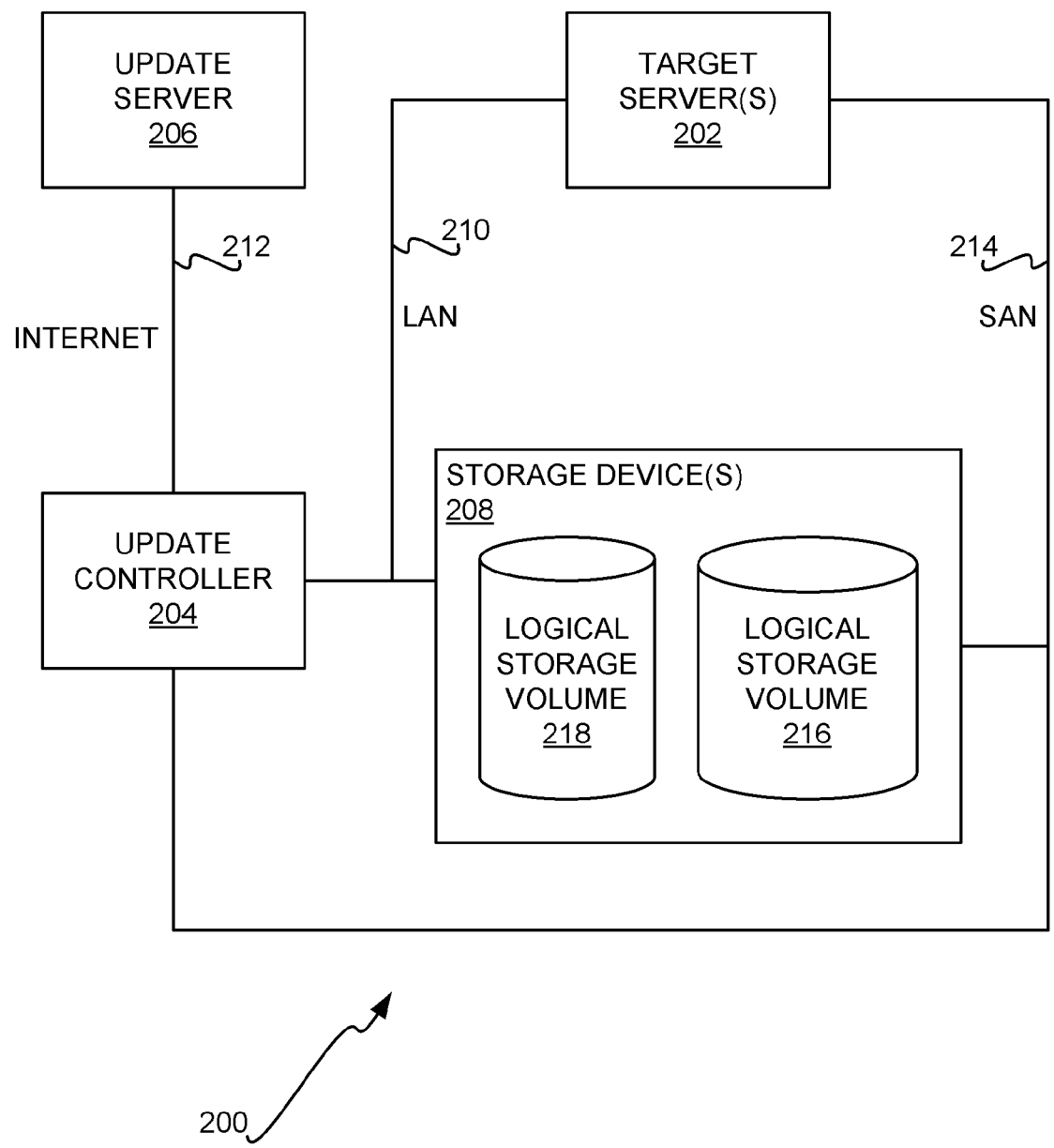
FIG. 2 is a diagram of a system, according to a logical boot storage volume embodiment of the invention.

FIG. 2 shows a system 200, according to a logical boot storage volume embodiment of the invention. The system 200 includes one or more target servers 202, an update controller 204, an update server 206, and one or more storage devices 208. As depicted in FIG. 2, a local-area network (LAN) 210 communicatively connects the target servers 202, the update controller 204, and the storage devices 208 with one another. As also depicted in FIG. 2, the Internet 212 communicatively connects the update controller 204 and the update server 206 with one another. As further depicted in FIG. 2, a storage-area network (SAN) 214 communicatively connects the storage devices 208 to the target servers 202 and the update controller 204, specifically for the servers 202 and the controller 204 to access data stored on the storage devices 208. The LAN 210, the Internet 212, and the SAN 214 are particular types of networks, and other types of networks may be employed, in addition to and/or in lieu of these networks.

The target servers 202 are the servers having components for which updated software is to be installed. The target servers 202 prior to installing this updated software perform functionality in furtherance of the intended or desired purpose of the production environment that the system 200 implements, where the terminology production environment is used here as has been described. The update controller 204 may be implemented in hardware and/or software, and may be a separate device, or part of another device, such as a management server responsible for managing the target servers 202. The update controller 204 performs the method 100 that has been described in relation to FIG. 1, as well as other methods of embodiments of the invention. The update server 206 stores the most recent updated software for a number of server components, including the components installed within the target servers 202.

The storage devices 208 are physical storage devices, such as networks of hard disk drives in one embodiment. In the embodiment of FIG. 2, two logical storage volumes 216 and 218 are implemented on one or more of the storage devices 208. The logical storage volumes 216 and 218 are storage volumes in that they store data. The logical storage volumes 216 and 218 are logical volumes in that they are defined logically and do not necessarily correspond to any particular of the actual physical storage devices 208 in at least some embodiments. For example, the logical storage volumes 216 and 218 may be storage logical units, or storage LUN's, as can be appreciated by those of ordinary skill within the art. The manner by which the logical storage volumes 216 and 218 are employed is now described in relation to FIG. 3.

Figure 3:
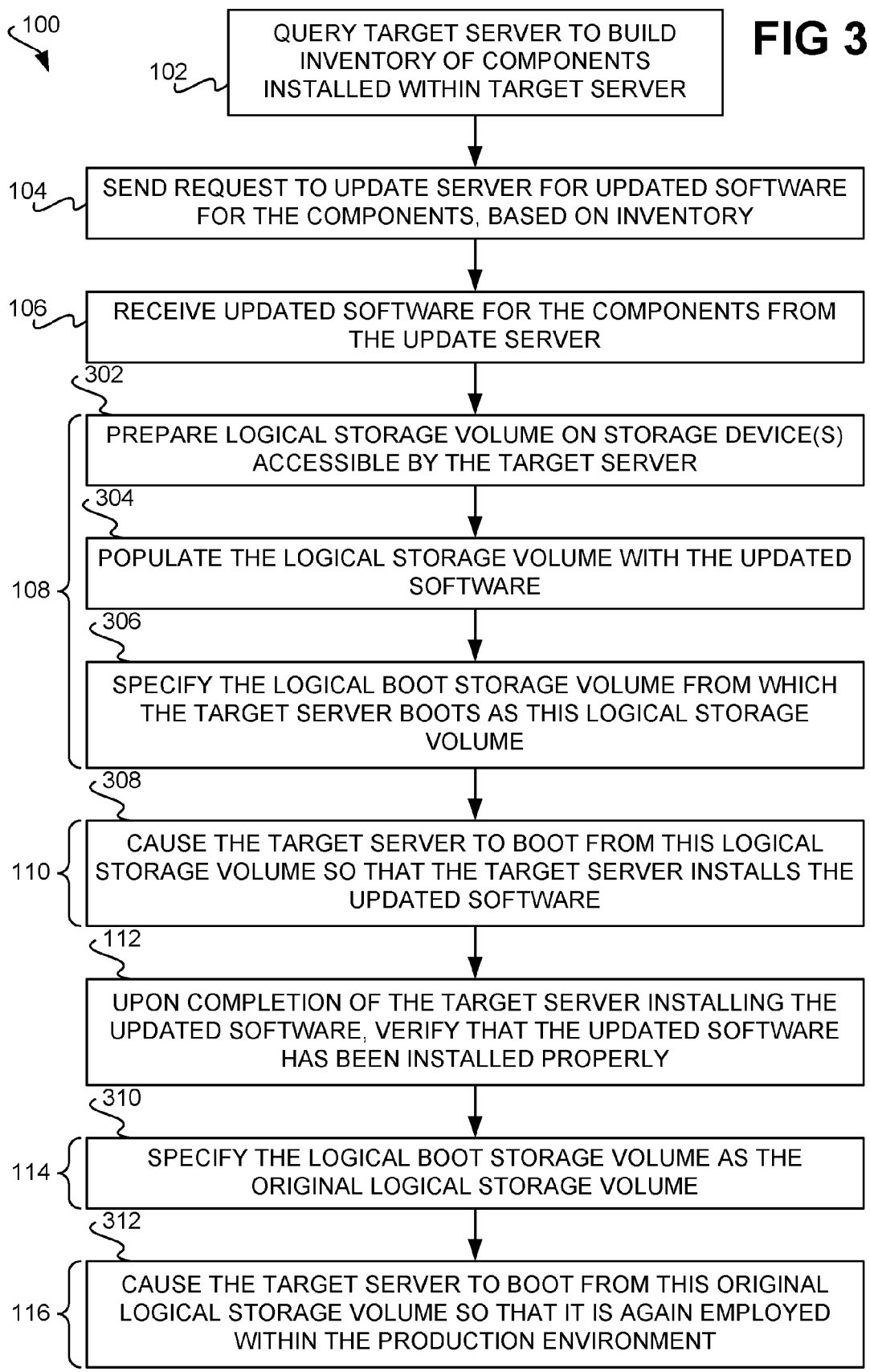
FIG. 3 is a flowchart of a method that is consistent with but more detailed than the method of FIG. 1, according to a logical boot storage volume embodiment of the invention.

FIG. 3 shows the method 100, according to the logical boot storage volume embodiment of the invention. The method 100 of the embodiment of FIG. 3 is performed by the update controller 204. The method 100 is described in relation to the system 200 of FIG. 2, specifically in relation to a particular target server 202. However, the method 100 may also be performed in relation to each of the target servers 202 in succession, where there is more than one target server 202, and may be performed in relation to other types of systems as well.

The update controller 204 queries the target server 202 to build an inventory of the components installed within the target server 202 (102), as has been described in relation to FIG. 1. As has also been described in relation to FIG. 1, the update controller 204 sends a request to the update server 206 for updated software for the components, based on the inventory built (104). The update controller 204 then receives the updated software for the components installed within the target server 202, from the update server 206 (302), as has been described in relation to FIG. 1 as well.

The update controller 204 next performs parts 302, 304, and 306, which together can constitute the performance of part 108 that has been described in relation to FIG. 1. It is noted first that the target server 202 has originally assigned to it the logical storage volume 216 as a logical boot storage volume. Thus, when the target server 202 is (re)booted, the target server 202 is said to boot from this logical storage volume 216 to be employed in the production environment implemented by the system 200 of FIG. 2. The logical storage volume 216 is in this respect considered an original logical boot storage volume, in that at the beginning of the method 100 of FIG. 3, the target server 202 is originally specified as having the volume 216 as its logical boot storage volume.

Now, the update controller 204 prepares the other logical storage volume 218 to be a logical boot storage volume (302), where the other logical storage volume 218 is also accessible by the target server 202 via, for instance the SAN 214. The update controller 204 then populates the logical storage volume 218 with the updated software for the components of the target server 202 that has been retrieved from the update server 206 (304). As part of part 304, the update controller 204 configures this logical storage volume 218 so that if the target server 202 were to boot from the volume 218, the server 202 would properly install and configure all the updated software in question.

Therefore, the update controller 204 specifies the logical boot storage volume of the target server 202 as the logical storage volume 218 (306), such that the logical boot storage volume of the target server 202 is no longer the original logical boot storage volume, which is the logical storage volume 216. The target server 202 is then caused to (re)boot from the logical storage volume 218 (308), where part 308 corresponds to part 110 that has been described in relation to FIG. 1. Thus, by booting from the logical storage volume 218, the target server 202 installs and configures the updated software for its components.

Upon completion of the target server 202 installing the updated software, the update controller 204 verifies that the updated software has been installed properly (112), as has been described in relation to FIG. 1. The update controller 204 then re-specifies the logical boot storage volume of the target server 202 as the original logical boot storage volume, the logical storage volume 216 (310), where part 310 corresponds to part 114 that has been described in relation to FIG. 1. Thus, the logical storage volume 218 that the target server 202 booted from in part 308 to install the updated software is no longer the boot logical storage volume of the server 202, but rather the logical storage volume 216 again is the boot logical storage volume of the server 202.

Finally, the update controller 204 causes the target server 202 to again (re)boot from the logical storage volume 216, so that the server 202 is again employed within the production environment of the system 200 of FIG. 2 as before (312), where part 312 corresponds to part 116 that has been described in relation to FIG. 1. Thus, in the logical boot storage volume embodiment of FIGS. 2 and 3, the update controller 204 configures the boot process of the target server 202 so that the server 202 installs the updated software for its components upon (re)booting by temporarily changing the logical boot storage volume of the server 202. Once the server 202 has installed the updated software, the update controller 204 reconfigures the boot process of the target server 202 so that it is again employed within the production environment by changing the logical boot storage volume of the server 202 back to its original logical boot storage volume.

Preboot Execution Environment Embodiments

Figure 4:
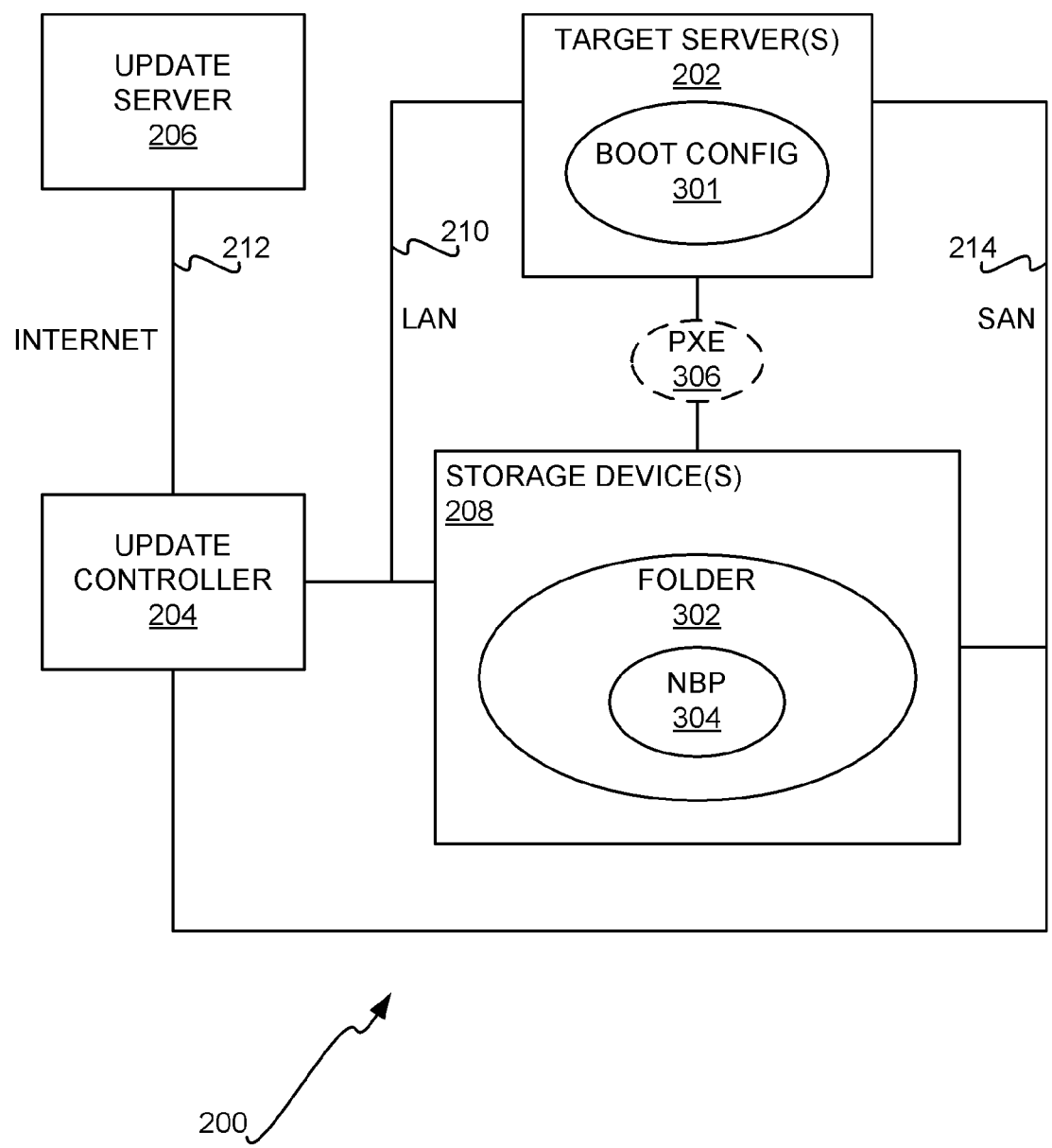
FIG. 4 is a diagram of a system, according to a preboot execution environment embodiment of the invention.

FIG. 4 shows the system 200, according to a preboot execution environment embodiment of the invention. The system 200 again includes the target servers 202, the update controller 204, the update server 206, and the storage devices 208. A local-area network (LAN) 210 communicatively connects the target servers 202, the update controller 204, and the storage devices 208 with one another, and the Internet 212 communicatively connects the update controller 204 and the update server 206 with one another. A storage-area network (SAN) 214 communicatively connects the storage devices 208 to the target servers 202 and the update controller 204, specifically for the servers 202 and the controller 204 to access data stored on the storage devices 208. The LAN 210, the Internet 212, and the SAN 214 are particular types of networks, and other types of networks may be employed, in addition to and/or in lieu of these networks.

The target servers 202 are the servers having components for which updated software is to be installed. The target servers 202 prior to installing this updated software perform functionality in furtherance of the intended or desired purpose of the production environment that the system 200 implements, where the terminology production environment is used here as has been described. Each target server 202 has a boot configuration 301. The boot configuration 301 specifies how the target server 202 in question is to be (re)booted.

That is, the boot configuration 301 specifies the process that the target server 202 in question follows when (re)booting.

The update controller 204 may be implemented in hardware and/or software, and may be a separate device, or part of another device, such as a management server responsible for managing the target servers 202. The update controller 204 performs the method 100 that has been described in relation to FIG. 1, as well as other methods of embodiments of the invention. The update server 206 stores the most recent updated software for a number of server components, including the components installed within the target servers 202.

The storage devices 208 are physical storage devices, such as networks of hard disk drives in one embodiment. In the embodiment of FIG. 4, a logical folder 302 is defined on the storage devices 208, as can be appreciated by those of ordinary skill within the art. What is referred to as a network boot program (NBP) 304 is created by the update controller 204 and stored on the logical folder 302. The NBP 304 is utilized in conjunction with a preboot execution environment (PXE) 306, as can be appreciated by those of ordinary skill within the art. Thus, the update controller 204 can specify that the boot configuration 301 of the target server 202 use the PXE 306 during (re)booting, such that the NBP 304 is executed by the target server 202 at the beginning of the (re)boot process. More details as to how the NBP 304 and the PXE 306 are employed are now presented in relation to FIG. 5.

Figure 5:
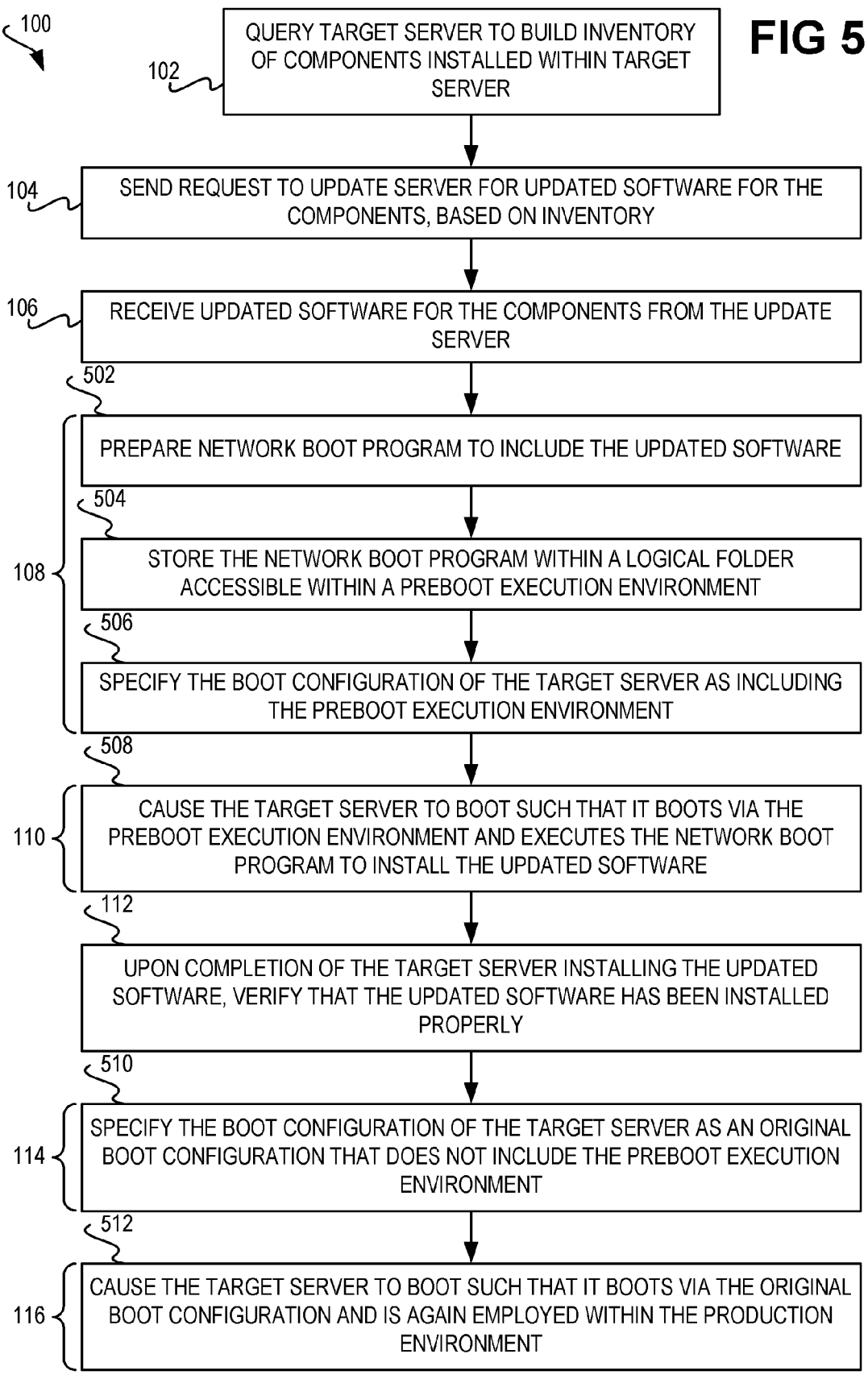
FIG. 5 is a flowchart of a method that is consistent with but more detailed than the method of FIG. 1, according to a preboot execution environment embodiment of the invention.

FIG. 5 shows the method 100, according to the preboot execution environment embodiment of the invention. The method 100 of the embodiment of FIG. 5 is performed by the update controller 204. The method 100 is described in relation to the system 200 of the embodiment of FIG. 4, specifically in relation to a particular target server 202. However, the method 100 may also be performed in relation to each of the target servers 202 in succession, where there is more than one target server 202, and may be performed in relation to other types of systems as well.

The update controller 204 queries the target server 202 to build an inventory of the components installed within the target server 202 (102), as has been described in relation to FIG. 1. As has also been described in relation to FIG. 1, the update controller 204 sends a request to the update server 206 for updated software for the components, based on the inventory built (104). The update controller 204 then receives the updated software for the components installed within the target server 202, from the update server 206 (302), as has been described in relation to FIG. 1 as well.

The update controller 204 next performs parts 502, 504, and 506, which together can constitute the performance of part 108 that has been described in relation to FIG. 1. It is noted first that the boot configuration 301 of the target server 202 prior to performance of the method 100 of FIG. 5 is considered the original boot configuration of the target server 202. The target server 202 when (re)booting in accordance with this original boot configuration causes the target server 202 to be employed in the production environment implemented by the system 200 of FIG. 4.

The update controller 204 prepares the NBP 304 to include the updated software for the components of the target server 202 (502). Thus, the NBP 304, when executed by the target server 202, causes the updated software to be installed within the target server 202, and also causes the updated software to be properly configured within the target server 202. The update controller 204 then stores the NBP 304 within the logical folder 302 that is accessible via or within the PXE 306 (504).

The update controller 204 specifies that the boot configuration 301 of the target server 202 is to include the PXE 306 (506). In other words, the update controller 204 modifies the boot configuration 301 so that the target server 202 accesses and executes the NBP 304 specified by and accessible via the PXE 306. The target server 202 is then caused to (re)boot such that it boots via the PXE 306 and executes the NBP 304 to install the updated software (508), where part 508 corresponds to part 110 that has been described in relation to FIG. 1. Thus, by booting via the PXE 306, the target server 202 executes the NBP 304 and installs and configures the updated software for its components.

Upon completion of the target server 202 installing the updated software, the update controller 204 verifies that the updated software has been properly installed (112), as has been described in relation to FIG. 1. The update controller 204 then re-specifies the boot configuration 301 of the target server 202 so that it does not include the PXE 306 any longer (510), where part 510 corresponds to part 114 that has been described in relation to FIG. 1. As such, the boot configuration 301 is returned to its original state (i.e. the original boot configuration) prior to the method 100 of the embodiment of FIG. 5 being performed. Therefore, the next time that the target server 202 is run, it will not perform the NBP 304 via the PXE 306.

Finally, the update controller 204 causes the target server 202 to again (re)boot, such that the server 202 boots using the original boot configuration and is again employed within the production environment of the system 200 of FIG. 4 as before (512), where part 512 corresponds to part 116 that has been described in relation to FIG. 1. Thus, in the PXE embodiment of FIGS. 4 and 5, the update controller 204 configures the boot process of the target server 202 so that the server 202 installs the updated software for its components upon (re)booting by temporarily modifying the boot configuration 301 to include the PXE 306 such that the NBP 304 is executed. Once the server 202 has installed the updated software, the update controller 204 reconfigures the boot process of the target server 202 so that it is again employed within the production environment by modifying the boot configuration 301 so that it no longer includes the PXE 306.

Scalable Server Embodiments

Figure 6:
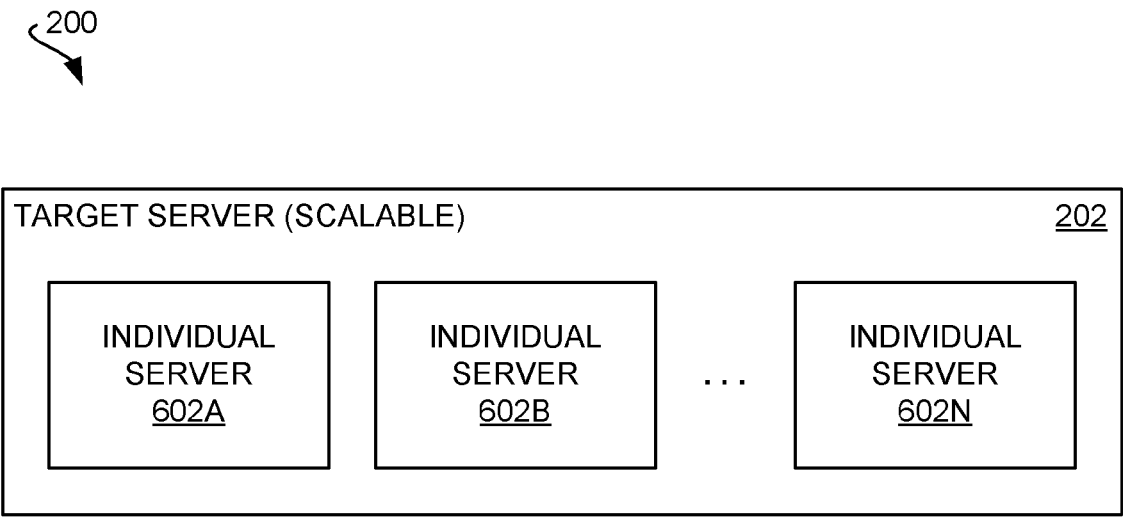
FIG. 6 is a diagram of a partial system, according to a scalable server embodiment of the invention.

In the embodiments of the invention that have been described, the target server in relation to which the methods are performed can be a single physical server. However, in other embodiments, the target server may be a scalable server, which is a type of virtual server encompassing a number of individual constituent servers that work together to act as a single (virtual) server. FIG. 6 shows a portion of the system 200, according to such a scalable server embodiment of the invention. The target server 202 is specifically a scalable server, and includes the individual constituent physical servers 602A, 602B, . . . , 602N, collectively referred to as the individual servers 602. The system 200 of the embodiment of FIG. 6 can be used in conjunction with the system 200 of the embodiment of FIG. 2 or with the system 200 of the embodiment of FIG. 4.

FIG. 7 shows the method 100, according to the scalable server embodiment of the invention. The method 100 of the embodiment of FIG. 7 is a modified version of the method 100 of the embodiment of FIG. 1 to be performed in relation to a scalable target server. However, those of ordinary skill within the art can appreciate that the method 100 of the embodiment of FIG. 3 or the method 100 of the embodiment of FIG. 5 can likewise be modified to be performed in relation to a scalable target server.

The update controller 204 queries the scalable target server 202 to build an inventory of the components installed within the scalable target server 202 (102), as has been described in relation to FIG. 1, where these components include all the components of each individual server 602 of the scalable target server 202. As has also been described in relation to FIG. 1, the update controller 204 sends a request to the update server 206 for updated software for the components, based on the inventory built (104). The update controller 204 then receives the updated software for the components installed within the individual servers 602 of the target server 202, from the update server 206 (302), as has been described in relation to FIG. 1 as well.

The scalable target server 202 is then reduced to its individual constituent servers 602 (702). That is, the scalable target server 202 is temporarily dissolved such that the individual servers 602 are revealed and exposed as individual servers, as opposed to as the encompassing (virtual) scalable target server 202. Thereafter, the update controller 204 performs parts 108, 110, and 112 as described in relation to the embodiment of FIG. 1 for each individual server 602, now that the individual servers 602 are individually exposed.

Thus, the update controller 204 configures the boot process of each individual server 602 so that each individual server 602 installs the updated software for each component of the individual server 602 in question the next time it boots (108). The update controller 204 causes each individual server 602 to boot such that the each individual server 602 installs the updated software in question (110). The update controller 204, upon completion of each individual server 602 installing the updated software in question, further verifies that the updated software has been installed properly (112). Parts 108, 110, and 112 may be performed in succession for the individual servers 602, such that parts 108, 110, and 112 are performed for one of the individual servers 602 then for another of the individual servers 602, and so on.

Thereafter, the boot process of the target server 202 is reconfigured, such that the target server 202 is reassembled from its individual constituent servers 602 so that the next time the target server 202 is (re)booted it is again employed within the production environment (706), where part 706 corresponds to part 114 that has been described in relation to FIG. 1. That is, part 706 includes reassembling the target server 202 from the individual servers 602. As such, the individual servers 602 are no longer individually exposed and revealed, but rather are exposed and revealed as the (virtual) scalable target server 202.

Finally, the update controller 204 causes the target server 202 to (re)boot, such that the server 202 is again employed within the production environment in question (116). Thus, in the scalable server embodiment of FIGS. 6 and 7, the scalable target server 202 is reduced to its individual constituent servers, and the process of installing the updated software is performed on an individual server-by-individual server basis. Once all the updated software has been installed within the individual servers, the scalable server can again be realized or reassembled, and (re)booted so that it is employed within the production environment.

CONCLUSION

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A method comprising:
   querying a target device to build an inventory of a plurality of components installed within the target device, the target device having a boot process by which the target device is employed within a production environment;
   receiving updated software for each component installed within the target device from an update server, based on the inventory built;
   configuring the boot process of the target device so that the target device installs the updated software for each component a next time the target device boots, instead of being employed within the production environment, by:
      preparing a logical storage volume on one or more storage devices accessible by the target device;
      populating the logical storage volume with the updated software for each component installed within the target device; and,
      specifying a logical boot storage volume of the target device as the logical storage volume;
   causing the target device to boot such that the target device boots from the logical storage volume and installs the updated software for each component installed within the target device;
   upon successful completion of the target device installing the updated software for each component, reconfiguring the boot process so that a next time the target device boots the target device is again employed within the production environment; and,
   causing the target device to boot such that the target device boots from the original storage volume and is again employed within the production environment.

2. The method of claim 1, wherein reconfiguring the boot process so that the next time the target device boots the target device is again employed within the production environment comprises specifying the logical boot storage volume of the target device as an original logical storage volume from which the target device previously booted to be employed within the production environment,
   and wherein causing the target device to boot such that the target device is again employed within the production environment comprises causing the target device to boot such that the target device boots from the original logical storage volume.

3. The method of claim 1, wherein the target device is a scalable server comprising a plurality of individual servers, and the method further comprises:
   reducing the scalable server to the individual servers such that temporarily the scalable server no longer exists,
   wherein configuring the boot process of the target device comprises configuring the boot process of each individual server so that each individual server installs the updated software the next time the individual server boots,
   and wherein causing the target device to boot comprises causing each individual server to boot such that each individual server installs the updated software.

4. The method of claim 3, wherein reconfiguring the boot process upon completion of the target device installing the updated software comprises, upon completion of each individual server installing the update software,
   reassembling the scalable server to include the individual servers such that the scalable server again exists.

5. The method of claim 1, further comprising providing the inventory built to the update server to request the updated software for each component installed within the target device from the update server.

6. The method of claim 1, further comprising verifying that the updated software for each component installed within the target device was properly installed by the target device.

7. The method of claim 1, wherein the components of the target device comprise one or more of: software of the target device software, and hardware of the target device.

8. A computer-readable medium having one or more computer programs stored thereon to perform a method comprising:
querying a target server to build an inventory of a plurality of components installed within the target server, the target server having an original logical storage volume from which the target server is booted to be employed within a production environment;
receiving updated software for each component installed within the target server from an update server, based on the inventory built;
preparing a logical storage volume on one or more storage devices accessible by the target server;
populating the logical storage volume with the updated software for each component installed within the target server;
specifying a logical boot storage volume of the target server as the logical storage volume;
causing the target server to boot such that the target server boots from the logical storage volume and installs the updated software for each component installed within the target server;
upon successful completion of the target server installing the updated software for each component, specifying the logical boot storage volume of the target server as the original logical storage volume; and,
causing the target server to boot such that the target server boots from the original storage volume and is again employed within the production environment.

9. The computer-readable medium of claim 8, wherein the target server is a scalable server comprising a plurality of individual server, such that the method is performed in relation to each individual server of the scalable server.

10. A computer-readable medium having one or more computer programs stored thereon to perform a method comprising:
querying a target server to build an inventory of a plurality of components installed within the target server, the target server having an original boot configuration via which the target server is booted to be employed within a production environment;
receiving updated software for each component installed within the target server from an update server, based on the inventory built;
preparing a network boot program to include the updated software for each component installed within the target server;
storing the network boot program within a logical folder accessible within a preboot execution environment;
specifying a boot configuration of the target server as including the preboot execution environment so that the target server executes the network boot program when booting the next time;
causing the target server to boot such that the target server boots via the preboot execution environment and installs the updated software for each component installed within the target server by executing the network boot program;
upon completion of the target server installing the updated software for each component, specifying the boot configuration of the target server as the original boot configuration such that the boot configuration no longer includes the preboot execution environment; and,
upon completion of the target server installing the updated software for each component, and after specifying the boot configuration of the target server as the original boot configuration, causing the target server to boot such that the target server boots via the original boot configuration and is again employed within the production environment, such that the target server does not execute the network boot program when being booted.

11. The computer-readable medium of claim 10, wherein the target server is a scalable server comprising a plurality of individual server, such that the method is performed in relation to each individual server of the scalable server.

12. A system comprising:
one or more networks;
an update server communicatively connected to the networks and having a plurality of updated software for different server components;
a target server communicatively connected to the networks and having a plurality of components installed therewithin that are to be updated, the plurality of components selected from the different server components, the target server having a boot process by which the target server is employed within a production environment;
a storage device having a logical folder, the storage device communicatively connected to the networks; and,
an update controller communicatively connected to the networks, the update controller adapted to:
query the target server to build an inventory of the components installed within the target server;
receive the updated software for each component from the update server, based on the inventory built;
configure the boot process of the target server so that the target server installs the updated software for each component a next time the target server boots, instead of being employed within the production environment, by:
preparing a network boot program to include the updated software for each component installed within the target server;
storing the network boot pro ram within the logical folder, the logical folder accessible within a preboot execution environment; and,
specifying a boot configuration of the target server as including the preboot execution environment;
cause the target server to boot such that the target server installs the updated software for each component by executing the network boot program;
reconfigure the boot process of the target server so that a next time the target server boots the target server is again employed within the production environment, by specifying the boot configuration of the target server as an original boot configuration via which the target server previously booted to be employed within the production environment such that the boot configuration no longer includes the preboot execution environment; and,
upon completion of the target server installing the updated software for each component, and after specifying the boot configuration of the target server as the original boot configuration, again cause the target server to boot such that the target server is again employed within the production environment, such that the target server does not execute the network boot program when being booted.

13. The system of claim 12, wherein the networks comprise:
- a local-area network (LAN) by which the update controller is communicatively connected to the target server for querying the target server; and,
- one or more other networks by which the update controller is communicatively connected to the update server for receiving the updated software from the update server.

14. The system of claim 12, wherein the target server is a scalable server comprising a plurality of individual servers, the plurality of components of the scalable server each being installed at one of the individual servers.

15. The system of claim 12, wherein the components of the target server comprise one or more of: software of the target server, and hardware of the target server.

* * * * *